Figure 1:
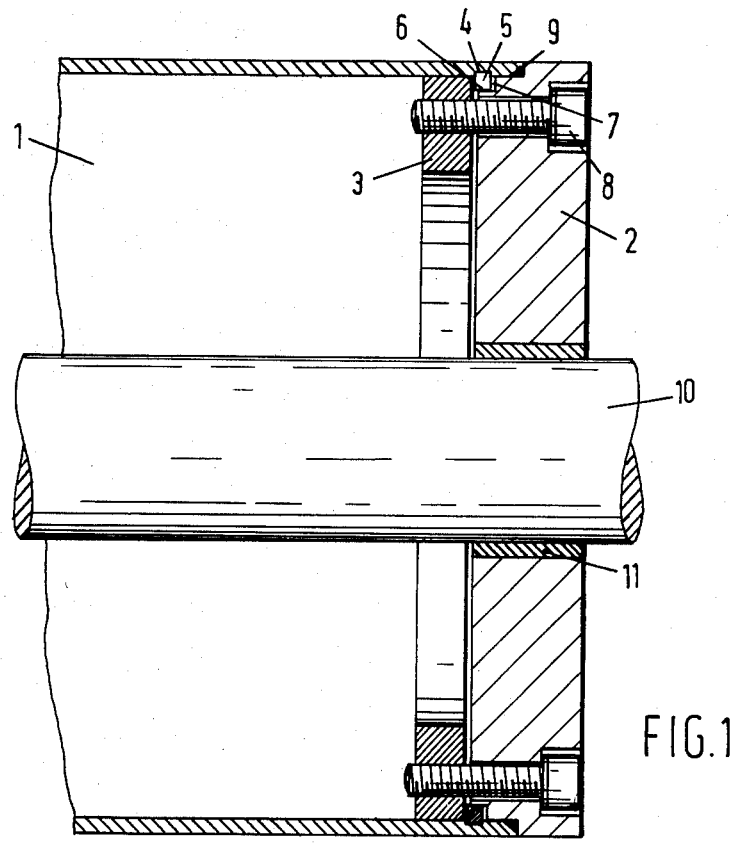

United States Patent [19]

van der Graaf

[11] Patent Number: 4,621,400

[45] Date of Patent: Nov. 11, 1986

[54] METHOD OF SECURING A COVER TO THE END OF A THIN-WALLED TUBE AND THE ARTICLE PRODUCED THEREBY

[75] Inventor: Meine H. van der Graaf, Vollenhove, Netherlands

[73] Assignee: Machinefabriek en Technische Handelsonderneming M.H. van der Graaf B.V., Vollenhove, Netherlands

[21] Appl. No.: 768,719

[22] Filed: Aug. 23, 1985

[30] Foreign Application Priority Data

Sep. 4, 1984 [NL] Netherlands .......................... 8402697

[51] Int. Cl.[4] .......................... B21B 31/08; B60B 7/04; B60B 7/06
[52] U.S. Cl. ......................................... 29/123; 29/129; 29/148.4 D; 29/453; 29/526 R; 403/326
[58] Field of Search .............. 29/526 R, 453, 148.4 D, 29/123, 118, 119, 129; 403/DIG. 7, 407, 372, 313, 326

[56] References Cited

U.S. PATENT DOCUMENTS

| | | |
|---|---|---|
| 3,013,487 | 12/1961 | Faeber .......................... 29/123 UX |
| 3,326,580 | 6/1967 | Munier et al. .................... 29/453 X |
| 3,535,977 | 10/1970 | Baumgarten .................... 403/326 X |
| 4,028,783 | 6/1977 | Buck ................................ 29/123 X |
| 4,130,911 | 12/1978 | Clark ............................... 29/123 X |
| 4,225,263 | 9/1980 | Asberg ................................ 403/326 |
| 4,229,950 | 10/1980 | Fessenden ........................ 29/129 X |
| 4,408,383 | 10/1983 | Nottingham et al. ........ 29/526 R X |
| 4,411,054 | 10/1983 | Zeilenga ........................... 29/453 X |
| 4,553,649 | 11/1985 | Bailey et al. ................... 403/372 X |

FOREIGN PATENT DOCUMENTS 417156  8/1925  Fed. Rep. of Germany ... 403/DIG. 7

Primary Examiner—Charlie T. Moon
Attorney, Agent, or Firm—Fleit, Jacobson, Cohn & Price

[57] ABSTRACT

A method of securing a cover to the end of a thin-walled tube using a flange. According to the invention the flange is slidably disposed in the tube and is restrained from being pulled out of the tube by a resilient ring accommodated in a shallow groove in the inner wall of the tube. The ring is maintained in position by a supporting edge of the cover or, alternatively, by bolts disposed closely to the circumferential edge of the cover to secure the cover to the flange.

7 Claims, 3 Drawing Figures

U.S. Patent  Nov. 11, 1986  4,621,400

METHOD OF SECURING A COVER TO THE END OF A THIN-WALLED TUBE AND THE ARTICLE PRODUCED THEREBY

This invention relates to a method of securing a cover to the end of a thin-walled tube, using a flange.

Such a construction is used, for example, for reversing rollers or driving rollers for endless conveyor belts, in which a motor is housed in the roller. As this motor must be accessible, and capable of being disassembled, the roller or tube must be open at least at one end. As the roller or tube is thin-walled, the cover can be secured by making the flange fast to one tube end, so that tube and flange form one whole, and subsequently securing the cover to the flange by means of screws. This solution has the disadvantage that the access opening is considerably reduced.

It is an object of the present invention to provide a solution for this problem.

According to the invention, there is provided a method of securing a cover to the end of a thin-walled tube using a flange, characterized in that said flange is slidably disposed in the tube and is restrained from being pulled out of the tube by a resilient ring accommodated in a shallow groove in the inner wall of the tube, said ring being maintained in position by a supporting edge of the cover. The supporting edge or circumferential recess of the cover is designed so that the resilient ring is confined in the radial direction, but is axially free from the supporting edge, so that when the screws are tightened, it is ensured that the cover is clamped against the end wall of the tube.

Alternatively, according to the present invention, the resilient ring is radially confined by disposing a sufficient number of bolts close to the circumferential edge of the cover to secure the cover to the flange, so that the resilient ring is supported by the bolts.

Proper retention of the resilient ring is promoted in both cases by making the ring and the shallow groove in the inner wall of the tube with a rectangular crosssectional configuration.

For sealing the joint, the tube end may be bevelled on the inside of the tube, and an O-ring arranged in the space thus formed.

Experiments have shown that the connection of the cover to the tube is so strong that a sufficient torque can also be transmitted when the cover or the flange are driven, so that the (sealed) joint excellently meets the demands imposed upon it.

Figure 2:
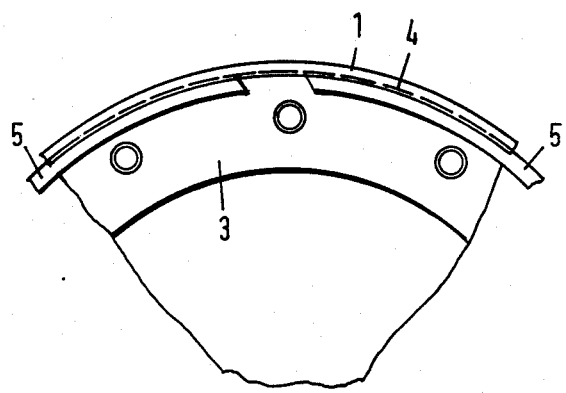
Figure 3:
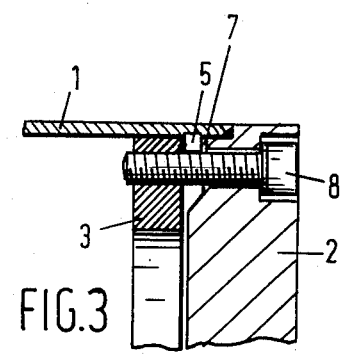

Some embodiments of the invention will now be described with reference to the accompanying drawings. In said drawings, FIG. 1 shows a cross-sectional view of a bearing plate or cover secured to a thin-walled tube according to the present invention;

FIG. 2 shows a side-elevational view of the arrangement of FIG. 1, but with the cover removed; and FIG. 3 is a view similar to FIG. 1, showing a part of a different embodiment of the arrangement.

Referring to the drawings, there is shown a drum or tube 1, to which a cover 2 is secured by means of a flange 3. For this purpose, flange 3 is disposed so as to be freely movable within the tube, whereafter a sharp-edged resilient ring 5 of substantially rectangular cross-sectional configuration is placed in a groove or recess 4 provided for the purpose in the inner wall of the tube. Thereafter the cover 2 is placed in position. Cover 2 is provided with a supporting edge 6. The diameters of the supporting edge and the spring ring have been selected so that, in the assembled condition, a closely-fitting whole, for example a sliding fit, is obtained.

The cover 2 is subsequently secured by means of bolts 8 whereby a clearance or gap 7 is left: in the absence of such a gap the clamping force will often be insufficient.

To provide an hermetic seal, the tube end wall is provided on the inside with a bevel accommodating an O-ring 9.

The tube is supported through cover 2 on a shaft 10 and this through the intermediary of a bearing 11.

The construction shown in FIG. 3 differs from that illustrated in FIG. 1 to the extent that the resilient ring 5 is radially confined not by means of a supporting edge of the cover, but by bolts 8 being disposed so closely to the circumference of the cover that, in the assembled condition, they directly support ring 5.

It will be clear that a large number of modifications are possible without departing from the scope of the invention.

What I claim:

1. A method of securing a cover to the end of a thin-walled tube using a flange, comprising slidably disposing flange in the tube, restraining said flange from being pulled out of the tube by inserting a resilient ring in a shallow groove in the inner wall of the tube, mounting said cover against the end of said tube, and securing said cover to said flange with said ring thereabetween to maintain said ring in position by a supporting edge of the cover.

2. A method of securing a cover to the end of a thin-walled tube using a flange, comprising slidably disposing said flange is slidably disposed in the tube and is restrained from being pulled out of the tube by a resilient ring accommodated in a shallow groove in the inner wall of the tube, said ring being maintained in position by bolts disposed closely to the circumferential edge of the cover to secure the cover to the flange.

3. A method according to claim 1, characterized in that the resilient ring and the shallow groove in the inner wall of the tube have a rectangular cross-sectional configuration.

4. A method according to claim 1, characterized in that a clearance (or gap) is formed between the resilient ring and the end of the supporting edge of the cover.

5. A method according to claim 1, characterized in that the tube end wall is bevelled on the inside to receive an O-ring.

6. A closure construction for a thin-walled tubular member, produced by the method as claimed in claim 1.

7. A closure construction for a thin-walled tubular member, produced by the method as claimed in claim 2.

* * * * *